United States Patent
Sayko et al.

(10) Patent No.: US 10,587,549 B2
(45) Date of Patent: *Mar. 10, 2020

(54) APPARATUS AND METHOD FOR MANAGING SHARING OF CONTENT

(71) Applicant: AT&T Intellectual Property I, L.P., Atlanta, GA (US)

(72) Inventors: Robert J. Sayko, Colts Neck, NJ (US); Chi-To Lin, Colts Neck, NJ (US); Douglas M. Nortz, Red Bank, NJ (US); Russell P. Sharples, East Windsor, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 118 days.

This patent is subject to a terminal disclaimer.

(21) Appl. No.: 15/952,959

(22) Filed: Apr. 13, 2018

(65) Prior Publication Data

US 2018/0234369 A1  Aug. 16, 2018

Related U.S. Application Data

(63) Continuation of application No. 15/208,978, filed on Jul. 13, 2016, now Pat. No. 9,979,684.

(51) Int. Cl.
*G06F 15/16* (2006.01)
*H04L 12/58* (2006.01)
(Continued)

(52) U.S. Cl.
CPC .............. *H04L 51/10* (2013.01); *G06F 21/10* (2013.01); *G06F 21/554* (2013.01); *H04L 51/32* (2013.01);
(Continued)

(58) Field of Classification Search
CPC ....... G06F 21/10; G06F 21/554; H04L 51/10; H04L 51/32; H04L 63/1433;
(Continued)

(56) References Cited

U.S. PATENT DOCUMENTS 7,020,304 B2  3/2006  Alattar et al.
7,475,242 B2  1/2009  Baird et al.
(Continued)

FOREIGN PATENT DOCUMENTS

WO          9743761 A2    11/1997

OTHER PUBLICATIONS

Bao, Long et al., "Conference 8755: MobileMultimedia/Image Processing, Security, and Applications 2013", Defense Security+ Sensing 16.16-17(2011):440, 2011,
(Continued)

*Primary Examiner* — Liang Che A Wang
(74) *Attorney, Agent, or Firm* — Guntin & Gust, PLC; John G. Rauch

(57) ABSTRACT

Aspects of the subject disclosure may include, for example, receiving an image, delivery instructions, and metadata associated with the image from a first device associated with a first user. The delivery instructions indicate to deliver the image to a second device associated with a second user, and the delivery instructions comprise security features and the metadata comprises a plurality of security preferences for delivery. Further, the plurality of security features and the plurality of security preferences are implemented on the image. In response to determination of a security risk due to the implemented security features or security preferences, the image is not delivered to the second device and a message is delivered to the first device indicating that the image was not delivered. Other embodiments are disclosed.

20 Claims, 8 Drawing Sheets

(51) Int. Cl.

| | | |
|---|---|---|
| *H04N 21/2343* | (2011.01) | |
| *H04N 21/236* | (2011.01) | |
| *H04N 21/858* | (2011.01) | |
| *H04L 29/06* | (2006.01) | |
| *G06F 21/10* | (2013.01) | |
| *H04N 21/414* | (2011.01) | |
| *H04N 21/4223* | (2011.01) | |
| *H04N 21/4788* | (2011.01) | |
| *G06F 21/55* | (2013.01) | |

(52) U.S. Cl.
CPC ... *H04L 63/1433* (2013.01); *H04N 21/23614* (2013.01); *H04N 21/234354* (2013.01); *H04N 21/41407* (2013.01); *H04N 21/4223* (2013.01); *H04N 21/4788* (2013.01); *H04N 21/858* (2013.01)

(58) Field of Classification Search
CPC ..... H04N 21/234354; H04N 21/23614; H04N 21/41407; H04N 21/4223; H04N 21/4788; H04N 21/858
USPC .......................... 709/205, 206, 217, 225, 229
See application file for complete search history.

(56) References Cited

U.S. PATENT DOCUMENTS

| | | | |
|---|---|---|---|
| 7,484,103 | B2 | 1/2009 | Woo et al. |
| 7,765,403 | B2 | 7/2010 | Stefik et al. |
| 7,962,413 | B2 | 6/2011 | Lisanke et al. |
| 8,220,016 | B2 | 7/2012 | Sugahara et al. |
| 8,813,193 | B2 | 8/2014 | Kim et al. |
| 8,839,448 | B2 | 9/2014 | White et al. |
| 8,938,671 | B2 | 1/2015 | Eisen et al. |
| 9,117,268 | B2 | 8/2015 | Reed |
| 9,235,711 | B1 | 1/2016 | Xavier |
| 9,285,981 | B1 | 3/2016 | Leavy |
| 2006/0075228 | A1 | 4/2006 | Black et al. |
| 2007/0061889 | A1 | 3/2007 | Sainaney et al. |
| 2008/0117295 | A1 | 5/2008 | Ebrahimi et al. |
| 2009/0064347 | A1 | 3/2009 | Bang et al. |
| 2009/0089663 | A1 | 4/2009 | Rebstock et al. |
| 2009/0296166 | A1 | 12/2009 | Schrichte et al. |
| 2010/0106658 | A1 | 4/2010 | Stefik et al. |
| 2010/0242091 | A1* | 9/2010 | Xu .......................... G06F 21/10 726/3 |
| 2013/0194301 | A1 | 8/2013 | Robbins et al. |
| 2014/0201527 | A1 | 7/2014 | Krivorot et al. |
| 2015/0172229 | A1* | 6/2015 | Brown .................... H04L 51/14 709/206 |
| 2015/0254454 | A1 | 9/2015 | Clemente et al. |
| 2015/0254467 | A1* | 9/2015 | Leuthardt ............... G06F 21/32 726/28 |
| 2016/0109954 | A1* | 4/2016 | Harris ..................... G06F 3/017 345/156 |
| 2016/0191822 | A1* | 6/2016 | Kosugou ........... H04N 5/23219 382/118 |
| 2017/0289147 | A1* | 10/2017 | Kyllonen ................ G06F 21/32 |
| 2018/0019962 | A1 | 1/2018 | Sayko et al. |

OTHER PUBLICATIONS

Singh, Prabhishek et al., "A survey of digital watermarking techniques, applications and attacks", International Journal of Engineering and Innovative Technology (IJEIT) 2.9 (2013): 165-175, 2013.

* cited by examiner

APPARATUS AND METHOD FOR MANAGING SHARING OF CONTENT

CROSS-REFERENCE TO RELATED APPLICATIONS

This application is a continuation of U.S. patent application Ser. No. 15/208,978, filed Jul. 13, 2016. All sections of the aforementioned application(s) and patent(s) are incorporated herein by reference in their entirety.

FIELD OF THE DISCLOSURE

The subject disclosure relates to an apparatus and method for managing sharing of content.

BACKGROUND

Text messages and multimedia messages (text messages that include media content such as still images, video, etc.) are exchanged among uses of a wireless network. Further, modern multimedia messaging systems allow recipient of multimedia messages to not only view but also forward messages to other users or post the multimedia messages onto social media. The benefit of a modern multimedia messaging system is that it allows a sender of the multimedia messages to reach recipients beyond those connected through her/his own social network.

BRIEF DESCRIPTION OF THE DRAWINGS

Reference will now be made to the accompanying drawings, which are not necessarily drawn to scale, and wherein.

DETAILED DESCRIPTION

Figure 1:
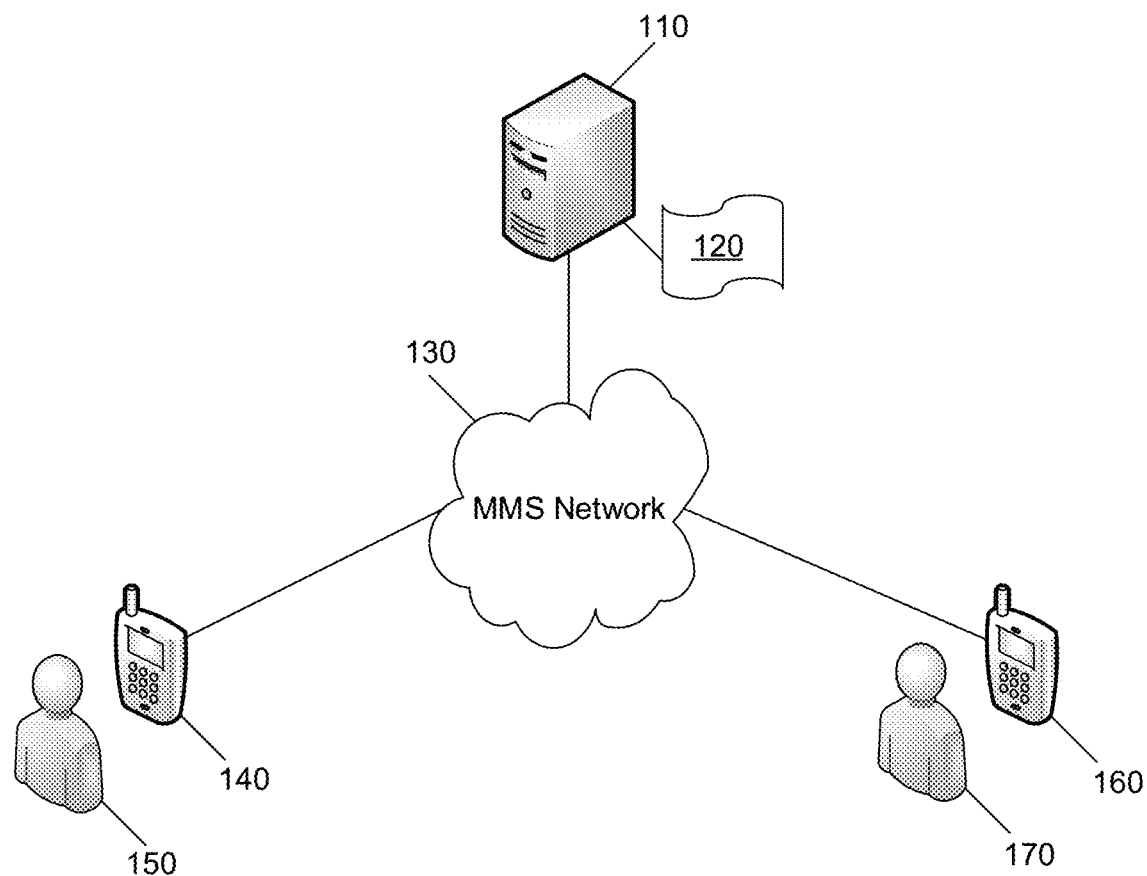
FIG. 1 depicts an illustrative embodiment of a system for managing and implementing security features and security preferences on media content in multimedia messages.

The subject disclosure describes, among other things, illustrative embodiments for managing messages over a communication network that supports text and multimedia messages. This includes securing delivery of the media content within the multimedia messages to the intended recipient. A network device operated by a service provider can receive a message that includes media content such as a still image or video from a sender's communication device. Further, the network device can receive instructions to implement certain security features and security preferences on the media content when sending the media content to a recipient's communication device. This can reduce a probability that the media content is viewed by someone other than the intended recipient. Further embodiments can implement the security features and security preferences not only on media content in text and multimedia messages but also on text files, spreadsheet files, portable document format (PDF) files, etc. that are transmitted over any communication network such that recipients of media content, text files, spreadsheet files, PDF files, etc. cannot store or otherwise capture the content. In some embodiments, the text files, spreadsheet files, PDF file, etc. can be converted into media content. The security features and security preferences described herein can be implemented on the converted media content. Additional embodiments can direct images, video, or media content to a recipient based on recipient identification information (e.g. mobile phone number, label in contact directory of a mobile phone, etc.). Various information can be used to determine a device of the recipient to deliver the image, video, or media content from a sender based on recipient identification information. This can include but not limited to, presence information of the recipient's various devices, preference of device provided by either the recipient or sender, device identification provided in a message, etc. One or more embodiments can distort an image by presenting video content that represents an image where individual frames of the video content are distorted. The distortion is not perceptible to a recipient viewing the content but is perceptible by another device recording and/or capturing the video content. Other embodiments are described in the subject disclosure.

One or more aspects of the subject disclosure include a device comprising a processing system including a processor and a memory that stores executable instructions that, when executed by the processing system, can facilitate performance of operations. The operations can include receiving media content, such as an image, and delivery instructions from a first device associated with a first user. The delivery instructions can indicate to deliver the image to a second device associated with a second user. The processing system can further facilitate performance of operations including generating distorted video content from the media content and streaming the distorted video content to the second device. The distorted video content, when presented on the second device, is viewable as the image, and when an image of the distorted video content is captured by the second device or another image capturing device results in a distorted image.

One or more aspects of the subject disclosure include a machine-readable storage medium, comprising executable instructions. The executable instructions, when executed by a processing system including a processor, facilitate performance of operations. The operations can include receiving media content, such as an image, delivery instructions, and metadata associated with the image from a first device associated with a first user. The delivery instructions can indicate delivering the image to a second device associated with a second user. Further, the delivery instructions comprise a plurality of security features for delivery and the metadata comprises a plurality of security preferences for delivery. The executable instructions can further facilitate performance of operations including implementing the plurality of security features and the plurality of security preferences on the media content. The executable instructions can also facilitate performance of operations including transmitting a message to the second device, wherein the message instructs the second device to capture an image of a viewing area, or viewer, of the second device and provide the captured image of the viewing area, or viewer, to the processing system. The executable instructions can further facilitate performance of operations including providing a message to the first device that the image was not delivered to the second device responsive to identifying a security risk in delivering the image to the second device.

One or more aspects of the subject disclosure includes a method. The method can include obtaining, by a processing system having a processor, media content, such as an image, delivery instructions, and metadata associated with the image from a first device associated with a first user. The delivery instructions indicate delivery of the image to a second device associated with a second user and the metadata comprises a plurality of security preferences for delivery. The method can further include generating, by the processing system, distorted video content from the image based on the delivery instructions and the plurality of security preferences. The method can also include transmitting, by the processing system, the distorted video content to the second device. The distorted video content, when presented on the second device, is viewable as the image, and when an image of the distorted video content is captured by the second device or another image capturing device results in a distorted image FIG. 1 depicts an illustrative embodiment of a system 100 that can be used to implement security features and security preferences for sharing of media content. As an example, system 100 can be a multimedia messaging system 100 that implements security features and security preferences on the media content within multimedia messages. The media content can be various types of media content including images, video, audio, graphics, and so forth. In one or more embodiments, the system 100 can include a multimedia messaging service (MMS) network 130. MMS network 130 can include various network elements, such as routers, switches, servers, and so forth, that facilitate communications. Further, the system 100 can include a multimedia messaging server 110 incorporating a multimedia messaging security function 120 that is communicatively coupled to the MMS network 130. One or more users can utilize communication services of the MMS network 130, such as a user 150 with a communication device 140 as well as another user 170 with a communication device 160 being communicative coupled to the MMS network 130.

In one or more embodiments, the user 150 can send, via communication device 140, a multimedia message that includes media content to the communication device 160 of the other user 170. Thus, a user 150 and communication device 140 can be called a sending user 150 and a sending communication device 140, respectively. Further, the user 150 can provide delivery instructions to the other user 170 that include implementing security features on the media content. The multimedia messaging server 110 can receive the media content and the delivery instructions from the sending communication device 140. The delivery instructions can indicate to deliver the media content to the other communication device 160. Thus, user 170 and communication device 160 can be called the recipient user 170 and recipient communication device 160, respectively. In addition, the delivery instructions can include, or indicate to implement, security features on the media content when delivering the media content to the recipient communication device 160. Security features can be generated by the sending communication device 140 in response to user-generated input provided by the sending user 150 via a user interface. In one or more embodiments, the system 100 can provide default security features for a user, as well as default security features system-wide.

In some embodiments, the multimedia messaging server 110 can receive metadata associated with the media content that includes security preferences for delivery of the media content to the recipient communication device 160. In one embodiment, metadata can be generated by the sending communication device 140 in response to user-generated input provided by the sending user 150 via a user interface. The system 100 can further provide default security preferences for a user, as well as default security preferences system-wide. In another embodiment, metadata can be generated by the server 110, such as based on the user-generated input provided by the sending user 150 via the user interface.

In one or more embodiments, the multimedia messaging server 110 can generate distorted video content from the received media content in response to the security features in the delivery instructions or to the security preferences in the metadata. If, for example, the media content is an image (e.g. still image or image from a video), then the distorted video content, when presented on the recipient communication device 160, is viewable as the media content. However, when an image of the distorted video content is captured by the recipient communication device 160 or another image capturing device results in a distorted image. Further, the multimedia messaging server 110 can send an access message to the recipient communication device 160. The access message can be a text or multimedia message that includes a user-selectable link to access the distorted video content. The recipient user 170 can select the link on the user interface of the recipient communication device 160. Responsive to selecting the link, the recipient communication device 160 can send a request to the multimedia messaging server 110 to stream the distorted video content. Responsive to receiving the request, the multimedia messaging server can stream the distorted video content to the recipient communication device 160 for viewing. In other embodiments, the recipient communication device can be programmed to automatically select the link to access the distorted video content.

In one or more embodiments, the multimedia messaging security function 120 can generate and stream the distorted video from the multimedia messaging server 110 to the recipient communication device 160 as part of implementing the security features and security preferences. Prior to streaming the distorted video content, the multimedia messaging security function 120, in conjunction with the multimedia messaging server 110, can transmit a message to the recipient communication device 160. The message instructs the recipient communication device 160 to capture an image of the viewing area, or viewer, with a forward facing camera of the recipient communication device 160 and provide the captured image of the viewing area, or viewer, to the multimedia messaging server 110. The viewing area is the area from where a recipient 170, or any viewer, can view media content on the recipient communication device 160, a portion of which can be captured forward facing camera of the recipient communication device 160. The multimedia messaging server 110 can implement the multimedia messaging security function 120 which performs image recognition techniques on the captured image to validate that the recipient user 170 is in the viewing area, or the viewer. If the multimedia messaging security function 120 determines that the recipient user 170 is within the viewing area, or the viewer, then the multimedia messaging security function 120 instructs the multimedia messaging server 110 to stream the distorted video content to the recipient communication device 160. However, if the multimedia messaging security function 120 determines that the recipient user 170 is not within the viewing area, or the viewer, then the multimedia messaging security function 120 can instruct the multimedia messaging server 110 not to stream the distorted video content to the recipient communication device 160. In further embodiments, the sending user 150 can send, via sending communication device 140, an image of the recipient user 170 to the multimedia messaging server 110. The multimedia messaging security function 120 can use the received image of the recipient user 170 to validate whether the recipient user 170 is within the captured image of the viewing area, or the viewer. In further embodiments, the multimedia messaging server 110 can have an image of the recipient user 170 stored in a database. The multimedia messaging security function 120 can retrieve the image of the recipient user 170 from the database and use image processing techniques to compare the retrieved image to the captured image to validate that the recipient user 170 is within the viewing area, or the viewer. In additional embodiments, if the multimedia messaging server 110 does not receive a captured image of the viewing area, or viewer (e.g., due to the camera on the recipient communication device 160 being blocked or inoperable), then the multimedia messaging server 110 may not deliver the media content or distorted video to recipient communication device 160.

In one or more embodiments, the recipient user 170 can be validated for viewing the distorted video content (or any media content sent to the recipient communication device by the sending communication device 140) using biometric data. That is, recipient user 170 may provide biometric data (e.g. fingerprint, voice recognition, etc.) to a recipient communication device 160 via a biometric scanning device. In some embodiments, the recipient communication device 160 can be a wearable computing device that can detect biometric data and supplies the biometric data to the multimedia messaging server 110 for validation. Further, the multimedia messaging server 110 can be supplied with biometric data of the recipient user 170 from another computing device. For example, recipient communication device 160 can be a smartphone that can receive media content for viewing. Another computing device associated with the recipient user 170 can be a wearable device (e.g. smartwatch). The wearable device can scan biometric data from the recipient user 160 and supply the biometric data to the multimedia messaging server 110 for validation for the recipient to view the media content on the smartphone.

In one or more embodiments, the multimedia messaging server 110 receives a captured image of the viewing area including the viewer of recipient communication device 160. Using image processing techniques, if the multimedia messaging security function 120 identifies a person other than the recipient user 170 or another image capturing device (e.g. camera) within the viewing area, or is the viewer, of communication device 160, then the multimedia messaging security function 120 can instruct the multimedia messaging server 110 not to deliver the media content or distorted video to recipient communication device 160. In another embodiment, the multimedia messaging security function 120 can instruct the multimedia messaging server 110 to deliver a message to the sending communication device 140 that the media content or distorted video was not delivered to the recipient communication device 160 due to a risk based on implementing at least one of the security features and/or security preferences. In one or more embodiments, the server 110 can monitor a history of denied streaming associated with a particular recipient device and can implement other security features or security preferences accordingly, such as blocking the particular recipient device from receiving the media content when a number of denied streaming events exceeds a threshold.

When the recipient user 170 views the distorted video generated from a still image of the media content on communication device 160, the recipient user 170 perceives the distorted video as the still image. The distorted video presents a sequence of frames of the still image. Further, distortion of the video can include blackening pixels (e.g., randomly) in frames of the distorted video. The frame rate can be fast enough (e.g. 30 frames per second) such that the recipient user 170 cannot perceive the blackened pixels in particular frames when viewing the distorted video, if generated from any type of media content (e.g. still image, video, etc.). However, if the recipient user 170 captures a screen shot of the distorted video or captures an image of the distorted video using another camera-enabled device (e.g. another smartphone), then the captured image of the distorted video contains blackened pixels such that the media content is unrecognizable (or otherwise distorted). In other embodiments, the pixels may not be blackened but converted, or otherwise changed, to different color such as gray or white. Thus, instead of blackening pixels, the pixels can be altered to be any different color. Further, the pixels may not be altered by color but by scrambling their position, altering their position, blurring, pixelization, or any techniques to alter the pixels. In some embodiments, the multimedia messaging security function 120 can use facial recognition techniques that identify an image of a face of a person in each frame of the distorted video and places the randomly blackened pixels on the image of the face of the person in each frame of the distorted video. Other techniques can be utilized for determining areas of an image to distort, such as positioning the blackened pixels near the center of the image. In one or more embodiments, the blackened pixels can change with each frame. In another embodiment, the blackened pixels can be the same but not included in every frame so that a user does not see the blackened pixels but a device attempting to capture an image of the distorted video captures the blackened pixels.

In one or more embodiments, the distorted video can be generated from the media content by altering the focus (e.g. blurring) of a portion or all of each frame of the distorted video and/or scrambling the position of pixels in each frame of the distorted video. Other methods can be used to generate the distorted video including shifting portions of pixels in each frame of the distorted video.

In one or more embodiments, the multimedia messaging security function 120 can implement other security features provided in the delivery instructions or security preferences provided in the metadata in conjunction with, in addition to, or instead of generating and streaming a distorted video from the media content. The security features and security preferences can include preventing recipient communication device 160 from forwarding the media content or the distorted video to another communication device, set a time to live for the media content or distorted video once viewed on the recipient communication device 160, set a number of views of the received media content or distorted video, and/or prevent screenshots of the media content or distorted video by the recipient communication device 160. Other security features and security preferences can include requiring the recipient user 170 to enter a passcode to view the received media content or distorted video. In some embodiments, when a passcode is necessary to view the received media content or distorted video, the recipient communication device 160 can request (e.g. via a text message) the passcode from the sending communication device 140. The sending user 150 can provide the passcode (e.g. via a text message) to the recipient user 170. In another embodiment, the sending user 150 may enter the passcode into their own sending communication device 140 for each instance the recipient user 170 requests to view the media content. In some embodiments, the media content, text associated with the media content, or distorted video can be watermarked when implementing security features and security preferences.

In one or more embodiments, the security features and the security preferences can further include determining a security level for the media content and applying different levels of distortion (or other security measures) accordingly, determining the level of distortion based on location (e.g. high level of distortion in a high-risk viewing area, only distributing distorted video if recipient communication device 160 has capability of performing other security functions (e.g. prevent forwarding, etc.), notifying sending communication device 140 that recipient communication device 160 lacks capability of performing certain security functions, delay delivery of media content or distorted video to allow sending user 150 to recall the delivery, allow recall of delivery until first viewing at the recipient communication device 160, and apply tags (e.g. regarding possible recipients or locations) to media content that facilitate implementation of security features and security preferences. In one or more embodiments, if the multimedia messaging security function 120 is incorporated in a communication device such as a mobile phone, the security features and the security preferences (e.g. distortion algorithm) can be stored in a Subscriber Identity Module (SIM) of the mobile phone.

In one or more embodiments, the multimedia messaging security function 120 can instruct the multimedia messaging server 110 to send a message to recipient communication device 160 to query its device type. The multimedia messaging security function 120 can implement security features and security preferences responsive to the received device type. For example, security features and security preferences may indicate to prevent delivery of the media content if recipient communication device 160 includes a television display that can be viewed by more than one person.

In one or more embodiments, the multimedia messaging security function 120 can instruct the multimedia messaging server 110 to send a message to recipient communication device 160 to request a location of recipient communication device 160. If the recipient communication device 160 includes location functions such as functions for use in conjunction with Global Positioning Systems (GPS), then the recipient communication device 160 can ascertain its location and send its location to the multimedia messaging server 110. The multimedia messaging security function 120 can implement security features and security preferences responsive to received location of recipient communication device 160. For example, the home address of recipient user 170 can be sent to the multimedia messaging server 110 by the sending user 150. Further, the home address of the recipient user 170 can be stored in a database accessible by the multimedia messaging server 110. Security features and security preferences may indicate to prevent delivery of received media content if the recipient communication device 160 is not within a certain radial distance of home address of recipient user 170. In other embodiments, the sending user 150 can provide a location or a plurality of locations of the recipient communication device 160 for the multimedia messaging server 110 to deliver or prevent from delivering the media content. In one or more embodiments, the multimedia messaging security function 120 can detect the type of content within the media content and implement security features and security preferences, accordingly. For example, responsive to detecting a person in the media content, the multimedia messaging security function 120 can implement generating and streaming a distorted video as a high level security measure. However, responsive to detecting no person and only public buildings in the media content, the multimedia messaging security function 120 can implement passcode protection as a lower level security measure. In another example, the media content can contain censored content (as determined a priori by the system 100 or by the sending user 150 that may include offensive or indecent subject matter) with respect to the recipient user 170 or recipient communication device 160. Thus, the multimedia messaging security function 120 may not transmit the media content to the recipient communication device 160, accordingly. Further, censored content can be deemed ineligible to be delivered based on user preferences associated with the sending communication device 140, recipient communication device 160, or a combination thereof.

In one or more embodiments, the sending user 140 can transmit media content in a multimedia message having audio. Responsive to multimedia messaging server 110 receiving the audio of the media content, the multimedia messaging security function 120 can generate audio distortion as a security measure that when sent to the recipient communication device 160, the recipient user 170 cannot perceive the distortion. However, if the distorted audio is recorded, upon playback of the recording the audio is unrecognizable thereby securing the audio from an unintended recipient, accordingly. An example of such audio distortion can be insertion of signal that interferes with operation of audio recording coder-decoder (codec) that during playback of the recorded distorted audio is unrecognizable. In some embodiments, the multimedia messaging security function 120 can send the instructions with the audio that prevents the recipient user 170 to listen to the audio through the speakers of the recipient communication device 160 and only through headphones.

In one or more embodiments, the sending user 140 via sending communication device 150 can provide a recall message to multimedia messaging server 110 to retrieve delivered media content from recipient communication device 160. Responsive to receiving the recall message, the multimedia messaging security function 120 sends a message to the recipient communication device 160 to return the delivered media content and then delete any copies from its memory.

In one or more embodiments, the multimedia messaging security function 120 can send a message to sending communication device 140 notifying or confirming to the sending user 150 that the media content has been delivered. In some embodiments, the multimedia messaging security function 120 can send a message to sending communication device 140 of the sending user 150 that the media content has not been delivered due to a security risk based on implementing at least one of the security features and security preferences.

In one or more embodiments, the service provider that operates the multimedia messaging service network 130 and provides the multimedia messaging service can bill or charge for implementing the security features and security preferences requested by the sending user 150. In some embodiments, the service provider can have sending user 150 subscribe to certain security packages and pay a monthly fee (through a user interface and/or a portal). In further embodiments, the service provider can bill or charge the sending user 150 for each instance security feature or preference performed.

Although FIG. 1 shows that the multimedia messaging security function 120 can be incorporated into multimedia messaging server 110, other embodiments can have a portion or the whole of multimedia messaging security function 120 incorporated in the sending communication device 140 and/or recipient communication device 160 as well as distributed across one or more devices among the multimedia messaging server 110, sending communication device 140 and recipient communication device 160, as well as other network devices.

Figure 2:
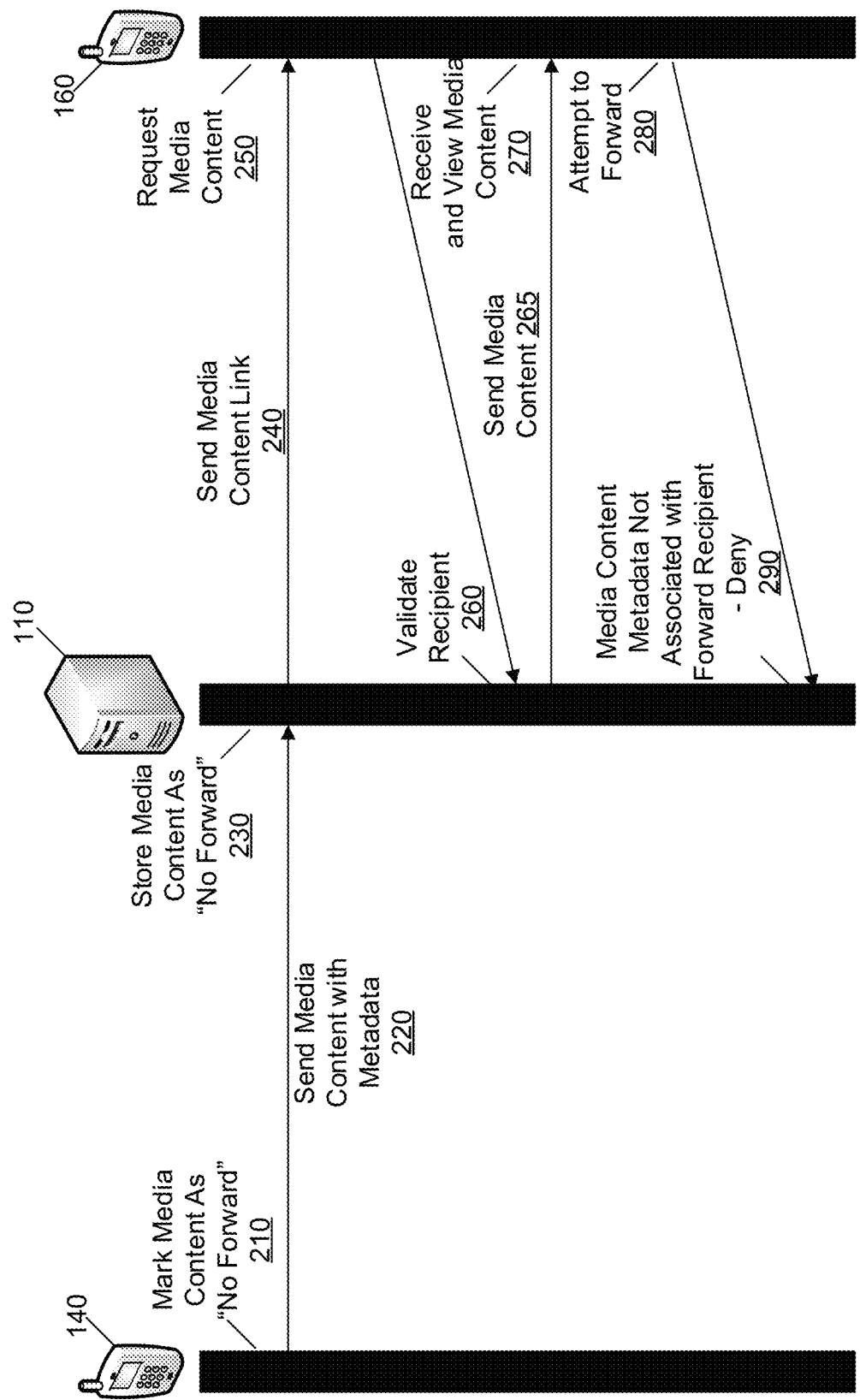
FIGS. 2-4 depict illustrative embodiments of a method used in portions of the system described in FIG. 1.

FIG. 2 depicts an illustrative embodiment of a method 200 operating in portions of the system in FIG. 1. Method 200 can begin with step 210 as a sending user 150 via sending communication device 140 indicates, via a user interface, that media content in a multimedia message cannot be forwarded to certain recipients when delivered to a recipient communication device 160 but can be forwarded to other recipients. In step 220, the sending communication device 140 transmits the media content with metadata indicating the lists of recipients to whom the media content can and cannot be forwarded. In step 230, the multimedia messaging server 110 stores the media content as well as the security preference of forwarding or not forwarding the media content according to the forwarding and not forwarding lists. In step 240, the multimedia messaging server 110 sends a message to the recipient communication device 160 that includes a user-selectable link to access the stored media content. In step 250, the recipient communication device 160 sends a request for the media content responsive to the recipient selecting the link via a user interface. In step 260, the multimedia messaging server 110 validates the recipient according to the stored list of forward recipients. In step 265, the multimedia messaging server 110 sends the media content to the recipient communication device 160. In step 270, the recipient communication device 160 receives and views the media content. In step 280, the recipient communication device 160 attempts to forward the media content to a forward recipient device. Responsive to the attempt to forward the media content, a message is sent to the multimedia messaging server 110. The message includes the identity of the forward recipient. In step 290, the multimedia messaging server 110 identifies the forward recipient and determines that the forward recipient is on the list of recipients not to forward the media content as provided in the received metadata. Thus, the multimedia messaging server 110 denies forwarding the media content to the forward recipient. This can include deactivating the user-selectable link provided to the recipient communication device 160. Alternatively, the multimedia messaging server 110 can send a message to the recipient communication device 160 that includes instructions that prevent the recipient communication device 160 to forward the media content.

Figure 3:
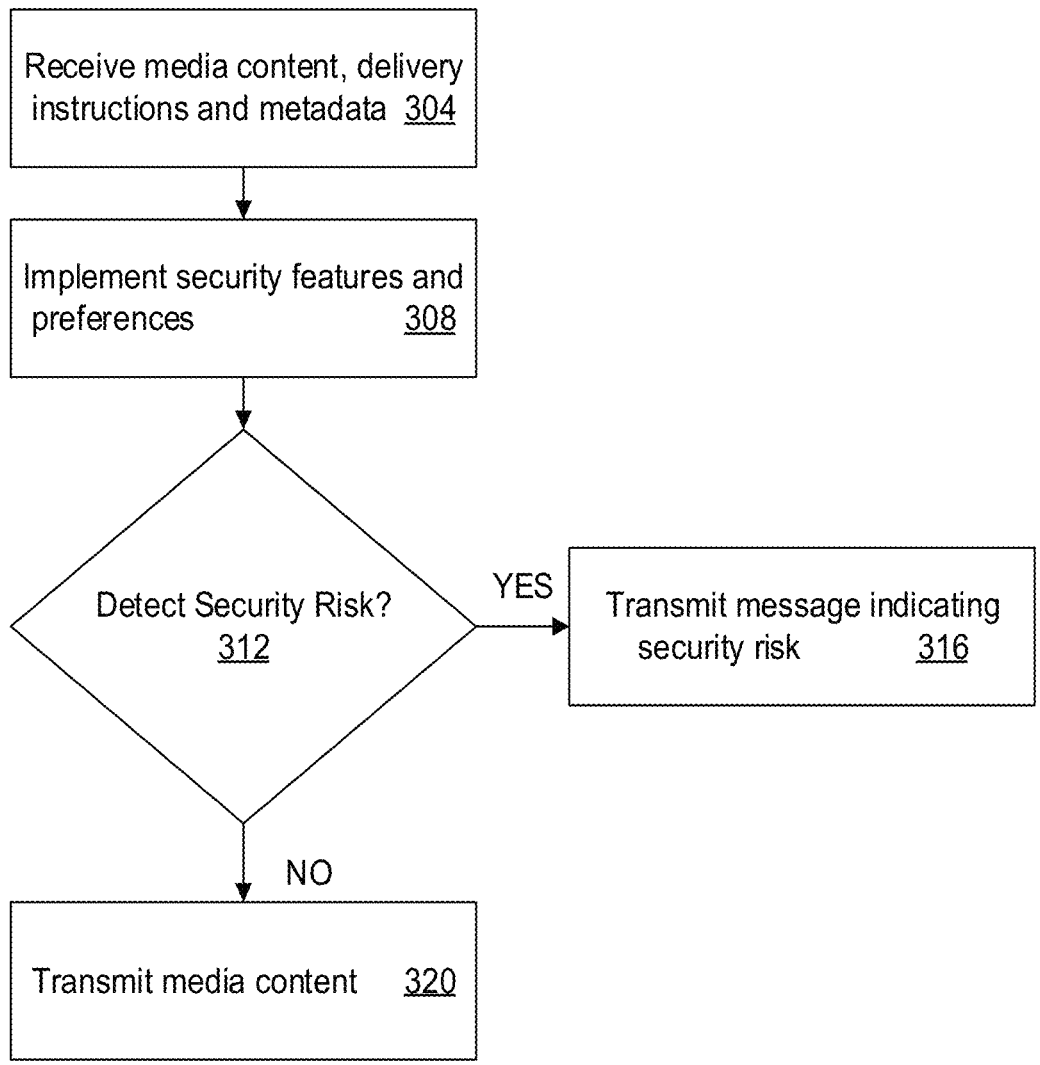

FIG. 3 depicts an illustrative embodiment of a method 300 operating portions of the system in FIG. 1. In step 304, a multimedia messaging server 110 incorporated with a multimedia messaging security function 120 receives media content within a multimedia message from sending communication device 140. Further, the multimedia messaging server 110 can receive delivery instructions or metadata with the media content, or before or after receipt of the media content. Delivery instructions can provide security features and metadata can provide security preferences for the multimedia messaging security function to implement on the media content for the delivery. Further, the delivery instructions identifies (e.g. name, mobile phone number, IP address, or any other type of identifier) the recipient communication device 160 to which the multimedia messaging server 110 should deliver the media content. In step 308, the multimedia messaging security function 120 implements the security features and security preferences on the media content. Security features and security preferences can include generating and streaming a distorted video of the media content to the recipient communication device 160. Further security features and security preferences can include preventing recipient communication device 160 from forwarding the media content or the distorted video to another communication device, set a time to live for the media content or distorted video once viewed on the recipient communication device 160, set a number of views of the received media content, or distorted video, and prevent screenshots of the received media content or distorted video from the recipient communication device 160. Other security features and security preferences can include requiring the recipient user 170 to enter a passcode to view the received media content, or distorted video. In some embodiments, when a passcode is necessary to view the received media content, or distorted video, the recipient communication device 160 can request (e.g. via a text message) the passcode from the sending communication device 140. The sending user 150 can provide the passcode (e.g. via a text message) to the recipient user 170. In another embodiment, the sending user 150 may enter the passcode into their own sending communication device 140 for each instance the recipient user 170 requests to view the media content or distorted video. In some embodiments, the media content, text associated with the media content, or distorted video can be watermarked when implementing security features and security preferences.

In one or more embodiments, the security features and the security preferences can further include determining a security level for the media content and applying different levels of distortion (or other security measures) accordingly, determining the level of distortion based on location (e.g. high level of distortion in a high-risk viewing area, only distributing distorted video if recipient communication device 160 has capability of performing other security functions (e.g. prevent forwarding, etc.); notifying sending communication device 140 that recipient communication device 160 lacks capability of performing certain security functions. delay delivery of media content or distorted video to allow sending user 150 to recall the delivery, allow recall of delivery until first viewing at the recipient communication device 160, and apply tags (e.g. regarding possible recipients or locations) to media content that facilitate implementation of security features and security preferences. In one or more embodiments, if the multimedia messaging security function 120 is incorporating in a communication device such as a mobile phone, the security features and the security preferences (e.g. distortion algorithm) can be stored in a SIM of the mobile phone.

In step 312, the multimedia messaging security function 120 determines whether it detects a security risk responsive to implementing the security features and security preferences. If so, in step 316, the multimedia messaging security function 120 instructs the multimedia messaging server 110 not to deliver the media content to the recipient communication device and transmits a message to the sending communication device 140 indicating a security risk in delivering the media content to the recipient communication device 160. However, if a security risk is not detected, then in step 320, the multimedia messaging server 110 is instructed by the multimedia messaging security function 120 to transmit the media content to the recipient communication device 160.

Figure 4:
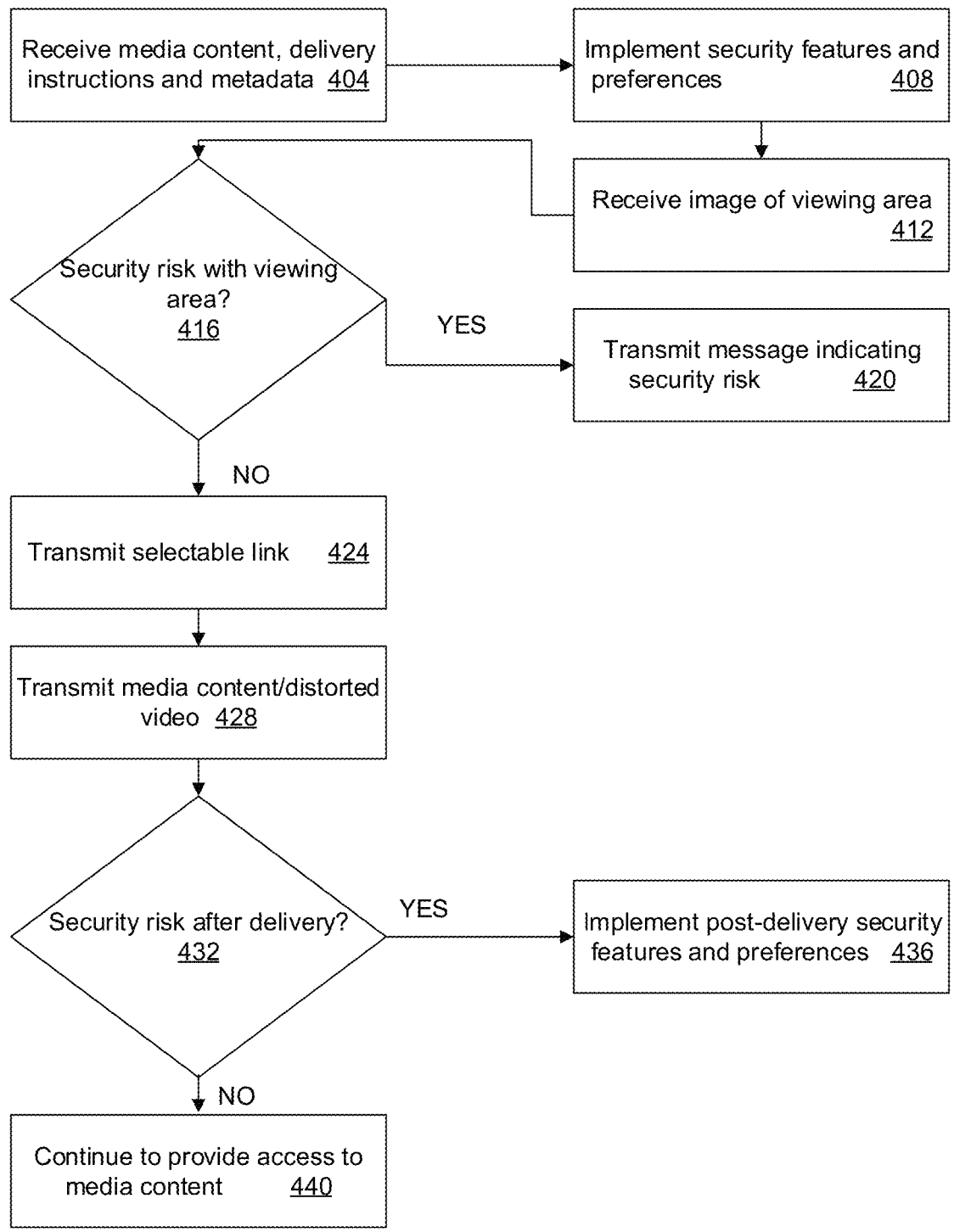

FIG. 4 depicts an illustrative embodiment of a method 400 operating in portions of the system in FIG. 1. In step 404, a multimedia messaging server 110 incorporated with a multimedia messaging security function 120 receives media content from sending communication device 140. Further, the multimedia messaging server 110 can receive delivery instructions or metadata with the media content, or before or after receipt of the media content. Delivery instructions can provide security features and metadata can provide security preferences for the multimedia messaging security function 120 to implement on the media content. Further, the delivery instructions identifies (e.g. name, mobile phone number, IP address, or any other type of identifier) the recipient communication device 160 to which the multimedia messaging server 110 should deliver the media content. In step 408, the multimedia messaging security function 120 implements the security features and security preferences on the media content.

One of the security features or security preferences can be capturing an image of the viewing area, or viewer, of recipient communication device 140. The multimedia messaging security function 120 implemented by the multimedia messaging server 110 transmits a message to the recipient communication device 160. The message instructs the recipient communication device 160 to capture an image of the viewing area, or viewer, with a forward facing camera of the recipient communication device 160 and provide the captured image of the viewing area, or viewer, to the multimedia messaging server 110. In step 412, the multimedia messaging server 110 receives the captured image of the viewing area, or viewer, of the recipient communication device 160. In step 416, the multimedia messaging server 110 can implement the multimedia messaging security function 120 to determine whether there is a security risk with the viewing area, or viewer of the recipient communication device 160. This can include performing image recognition techniques on the captured image to validate that the recipient user 170 is in the viewing area, or the viewer. However, if the multimedia messaging security function 120 determines that the recipient user 170 is not in the viewing area, or the viewer (or unauthorized viewers are in the viewing area), then the multimedia messaging security function 120 can determine a security risk with the viewing area, or viewer. For instance, authorization for viewing may be only to the intended recipient or the authorization may be to the intended recipient as well as anyone who is in proximity to the intended recipient. In further embodiments, the multimedia messaging server 110 can have an image of the recipient user 170 stored in a database. The multimedia messaging security function can retrieve the image of the recipient user 170 from the database and use image processing techniques to compare the retrieved image to the captured image to validate that the recipient user 170 is within the viewing area, or the viewer. In additional embodiments, if the multimedia messaging server 110 does not receive captured image of the viewing area, or viewer, due to the camera on recipient communication device 160 being blocked or inoperable, then the multimedia messaging security function 120 determines a security risk with the viewing area, or viewer. In further embodiments, using image processing techniques, the multimedia messaging security function 120 identifies a person other than the recipient user 170 or another image capturing device (e.g. camera) within the viewing area, or viewer of communication device 160, thereby determining a security risk with the viewing area, or viewer.

If a security risk is determined with the viewing area, or viewer, then in step 420, the multimedia messaging security function 120 instructs the multimedia messaging server 110 not to deliver the media content to the recipient communication device and transmits a message to the sending communication device 140 indicating a security risk and that the media content was not delivered to the recipient communication device 160. However, if there is not a security risk, then in step 424, the multimedia messaging server 110 is instructed by the multimedia messaging security function 120 to transmit an access message to the recipient communication device 160. In some embodiments, the access message can be a text or multimedia message that includes a user-selectable link to access the media content. In other embodiments, security features and/or security preferences indicate to generate a distorted video from the media content that is streamed upon selection of the link. The recipient user 170 can select the link on the user interface of the recipient communication device 160. Responsive to the recipient user 170 selecting the link, the recipient communication device 160 can send a request to the multimedia messaging server 110 to transmit the media content or stream the distorted video content. Responsive to receiving the request, the multimedia messaging server 110 can transmit the media content or stream the distorted video content to recipient communication device 160. In other embodiments, the access message can include the media content itself.

In step 432, the multimedia messaging security function 120 can determine whether there is a security risk to the media content or distorted video after delivery. For example, an incorrect passcode may have been entered to view the media content or distorted video. In another example, a captured image of the viewing area, or the viewer, indicates that a person other than the recipient user 170 is in the viewing area, or viewer. In a further example, the multimedia messaging security function 120 determines that the location of recipient communication device 160 has changed from the recipient's home address (a safe environment to view the media content or distorted video) to a public location (e.g. school, that is not a safe environment to view the media content or distorted video). In an additional example, the sending user 140 with sending communication device 150 can provide a recall message to multimedia messaging server 110 to retrieve a delivered media content or distorted video from recipient communication device 160. If a security risk is determined after delivery of the media content or distorted video, then in step 436, the multimedia messaging security function 120 implements post-delivery security features and/or security preferences. For example, if an incorrect passcode has been entered to view the media content, a person other than the recipient user 170 has entered the viewing area, the location of the recipient communication device has changed to a public place, or a recall message has been received from the sending communication device 140, then the multimedia messaging security function 120 sends a message to the recipient communication device 160 to return the delivered media content and then delete any copies from its memory or discontinue access to the media content or distorted video via the user-selectable link. If a security risk has not been determined after delivery, then the multimedia messaging server 110 continues to provide access to the media content or distorted video (e.g. via the user-selectable link).

While for purposes of simplicity of explanation, the respective processes are shown and described as a series of blocks in FIGS. 3 and 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
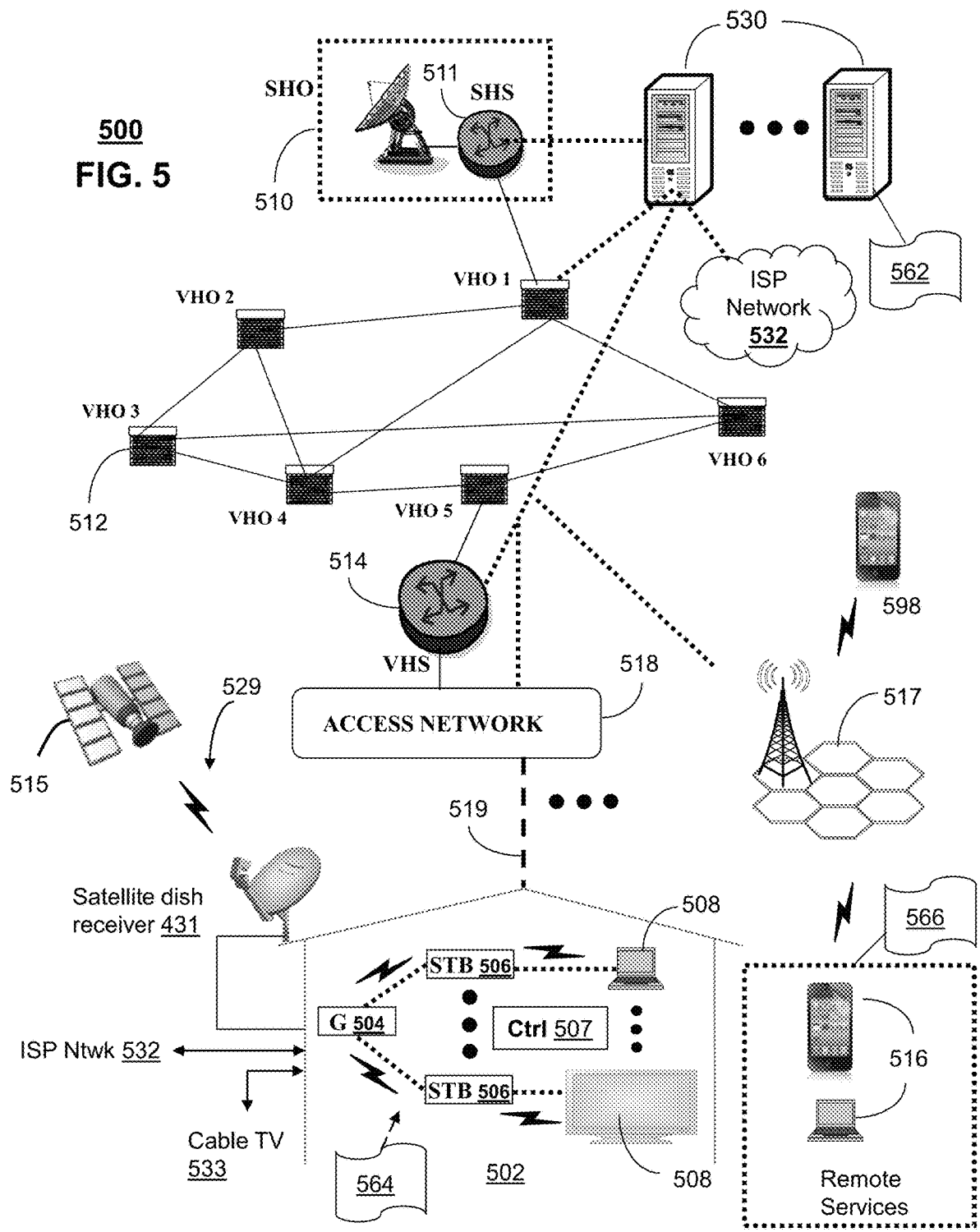
FIGS. 5-6 depict illustrative embodiments of communication systems that provide multimedia messaging services.

FIG. 5 depicts an illustrative embodiment of a communication system 500 for delivering media content and multimedia messaging services. The communication system 500 can represent various types of communication systems including an interactive television system, such as an Internet Protocol Television (IPTV) media system. Communication system 500 can be overlaid or operably coupled with system 100 of FIG. 1 as another representative embodiment of communication system 500. For instance, one or more devices illustrated in the communication system 500 of FIG. 5 can receive media content within a multimedia message and delivery instructions from a communication device associated with a user. The delivery instructions can indicate to deliver the media content to another device associated with another user according to security features and security preferences. Further, the one or more devices can generate distorted video content from the media content and stream the distorted video content to the other communication device as a security feature or security preference. Distortion of the video can include blackening pixels (e.g., randomly) in frames of the distorted video. The frame rate can be fast enough (e.g. 30 frames per second) such that a recipient user cannot perceive the blackened pixels in particular frames when viewing the distorted video, if generated from any type of media content (e.g. still image, video, etc.). However, if the recipient user via a recipient communication device captures a screen shot of the distorted video or captures an image of the distorted video using another camera-enabled device (e.g. another smartphone), then the captured image of the distorted video contains blackened pixels such that the media content is unrecognizable (or otherwise distorted).

In other embodiments, a recipient communication device can be a set-top box that can capture the viewing area, or viewers, to determine if authorized viewers are present in the viewing area. If so, then the distorted video can be transmitted to the set-top box. However, if unauthorized viewers or image capture devices (e.g. camera enabled smartphones) are within the viewing area, then the distorted video is not transmitted to the set-top box.

The system 500 can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516. In one or more embodiments, the one or more computing device 530 can receive media content within a multimedia message from a sending communication device 516 as well as delivery instructions indicating a recipient communication device 598 to which to deliver the media content. Communication system 500 can also provide for all or a portion of the computing devices 530 to function as an entire or portion of a multimedia messaging management system. The multimedia messaging management system 530 can use computing and communication technology to perform security function 562, which can include among other things, the security techniques described by methods 200,300, and 400 of FIGS. 3 and 4, respectively. For instance, function 562 of server 530 can be similar to the functions described for server 110 of FIG. 1 in accordance with methods 200, 300, and 400. The media processors 506 and wireless communication devices 516 can be provisioned with software functions 564 and 566, respectively, to utilize the services of multimedia messaging server 530 including multimedia messaging security function 562. For instance, functions 564 and 566 of media processors 506 and wireless communication devices 516 can be similar to the functions described for the communication devices 140 and 160 of FIG. 1 in accordance with methods 200, 300, and 400.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
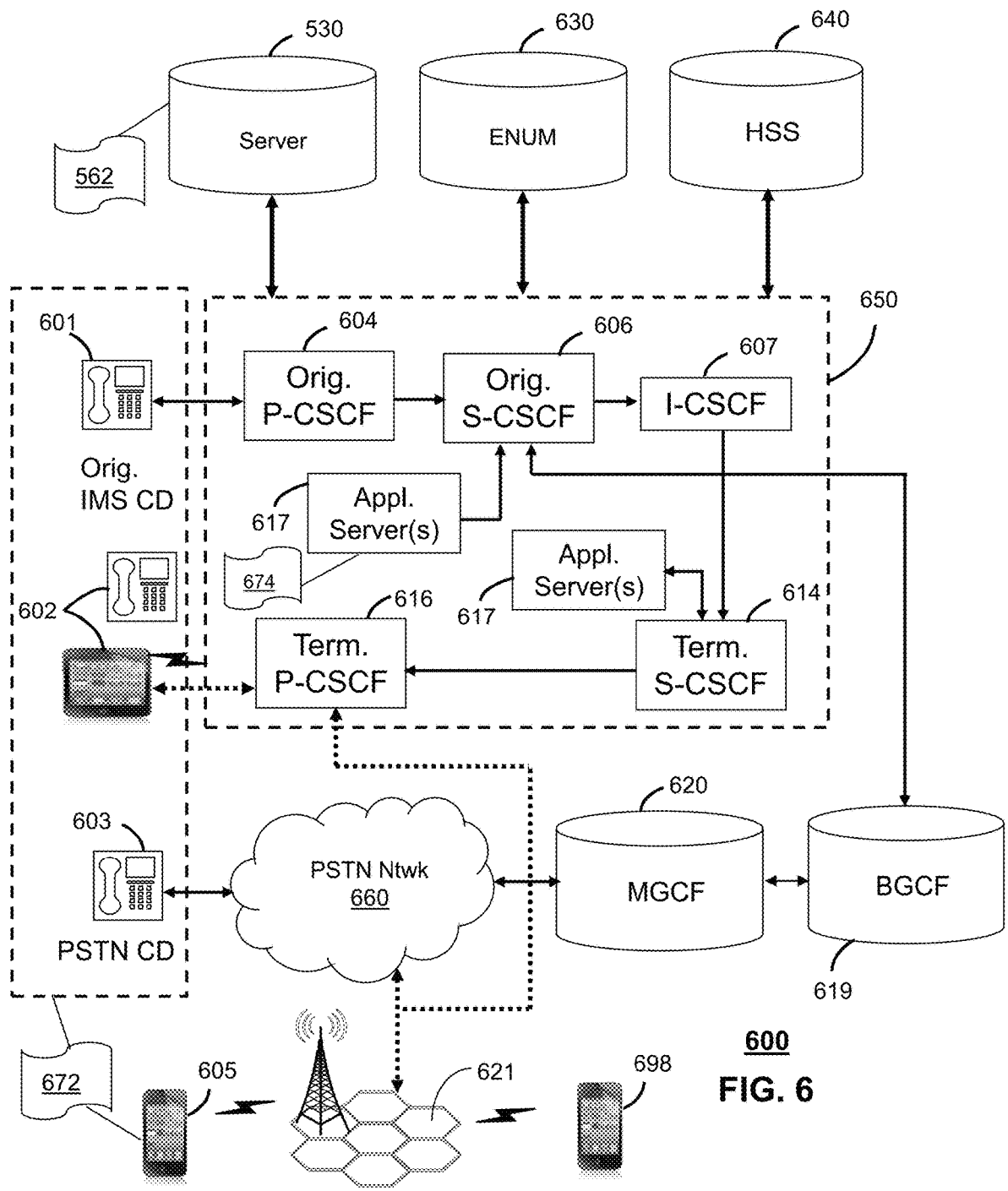

FIG. 6 depicts an illustrative embodiment of a communication system 600 employing an IP Multimedia Subsystem (IMS) network architecture to facilitate the combined services of circuit-switched and packet-switched systems. Communication system 600 can be overlaid or operably coupled with system 100 of FIG. 1 and communication system 500 as another representative embodiment of communication system 500. In one or more embodiments, a server 530 can receive media content associated with a multimedia message from a sending communication device 605 as well as delivery instructions to indicate to which to deliver the media content to a recipient communication device 698. Further, the metadata associated with the media content can also be received by the server 530. The delivery instructions can include security features and the metadata can include security preferences that can be implemented on the media content by the security function 562 incorporated into server 530. In some embodiments, the server 530 can provide a message to the sending communication device 605 that the media content was not delivered to the recipient communication device due a security risk discovered in response to implementing the security features and security preferences. In further embodiments, a security risk was not determined and media content, on which the security features or security preferences were implemented, is delivered to the recipient communication device 698. In additional embodiments, a security risk is determined by the security function 562 after delivery and post-delivery security features and security preferences are implemented. These can include sending a recall message to recipient communication device 698 to return the media content and delete copies from its memory or discontinue access to the media content via a user-selectable link.

Communication system 600 can comprise a Home Subscriber Server (HSS) 640, a tElephone NUmber Mapping (ENUM) server 630, and other network elements of an IMS network 650. The IMS network 650 can establish communications between IMS-compliant communication devices (CDs) 601, 602, Public Switched Telephone Network (PSTN) CDs 603, 605, and combinations thereof by way of a Media Gateway Control Function (MGCF) 620 coupled to a PSTN network 660. The MGCF 620 need not be used when a communication session involves IMS CD to IMS CD communications. A communication session involving at least one PSTN CD may utilize the MGCF 620.

IMS CDs 601, 602 can register with the IMS network 650 by contacting a Proxy Call Session Control Function (P-CSCF) which communicates with an interrogating CSCF (I-CSCF), which in turn, communicates with a Serving CSCF (S-CSCF) to register the CDs with the HSS 640. To initiate a communication session between CDs, an originating IMS CD 601 can submit a Session Initiation Protocol (SIP INVITE) message to an originating P-CSCF 604 which communicates with a corresponding originating S-CSCF 606. The originating S-CSCF 606 can submit the SIP INVITE message to one or more application servers (Aas) 617 that can provide a variety of services to IMS subscribers.

For example, the application servers 617 can be used to perform originating call feature treatment functions on the calling party number received by the originating S-CSCF 606 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 606 can submit queries to the ENUM system 630 to translate an E.164 telephone number in the SIP INVITE message to a SIP Uniform Resource Identifier (URI) if the terminating communication device is IMS-compliant. The SIP URI can be used by an Interrogating CSCF (I-CSCF) 607 to submit a query to the HSS 640 to identify a terminating S-CSCF 614 associated with a terminating IMS CD such as reference 602. Once identified, the I-CSCF 507 can submit the SIP INVITE message to the terminating S-CSCF 614. The terminating S-CSCF 614 can then identify a terminating P-CSCF 616 associated with the terminating CD 602. The P-CSCF 616 may then signal the CD 602 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 6 may be interchangeable. It is further noted that communication system 600 can be adapted to support video conferencing. In addition, communication system 600 can be adapted to provide the IMS CDs 601, 602 with the multimedia and Internet services of communication system 500 of FIG. 5.

If the terminating communication device is instead a PSTN CD such as CD 603 or CD 605 (in instances where the cellular phone only supports circuit-switched voice communications), the ENUM system 630 can respond with an unsuccessful address resolution which can cause the originating S-CSCF 606 to forward the call to the MGCF 620 via a Breakout Gateway Control Function (BGCF) 619. The MGCF 620 can then initiate the call to the terminating PSTN CD over the PSTN network 660 to enable the calling and called parties to engage in voice and/or data communications.

It is further appreciated that the CDs of FIG. 6 can operate as wireline or wireless devices. For example, the CDs of FIG. 6 can be communicatively coupled to a cellular base station 621, a femtocell, a WiFi router, a Digital Enhanced Cordless Telecommunications (DECT) base unit, or another suitable wireless access unit to establish communications with the IMS network 650 of FIG. 6. The cellular access base station 621 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 6.

Cellular phones supporting LTE can support packet-switched voice and packet-switched data communications and thus may operate as IMS-compliant mobile devices. In this embodiment, the cellular base station 621 may communicate directly with the IMS network 650 as shown by the arrow connecting the cellular base station 621 and the P-CSCF 616.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The multimedia messaging server 530 of FIG. 5 can be operably coupled to communication system 600 for purposes similar to those described above. Multimedia messaging server 530 can perform security function 562 and thereby provide multimedia messaging security services to the CDs 601, 602, 603, 605 and 698 of FIG. 6 similar to the functions described for server 110 of FIG. 1 in accordance with methods 200, 300, and 400 of FIGS. 2, 3, and 4, respectively. CDs 601, 602, 603, 605 and 698, which can be adapted with software to perform functions of 562 and/or 672 to utilize the security services of the multimedia messaging server 530 similar to the functions described for communication devices 140 and 160 of FIG. 1 in accordance with methods 200, 300, and 400 of FIGS. 2, 3, and 4. Server 530 can be an integral part of the application server(s) 617 performing function 674, which can be substantially similar to function 562 and adapted to the operations of the IMS network 650.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 7:
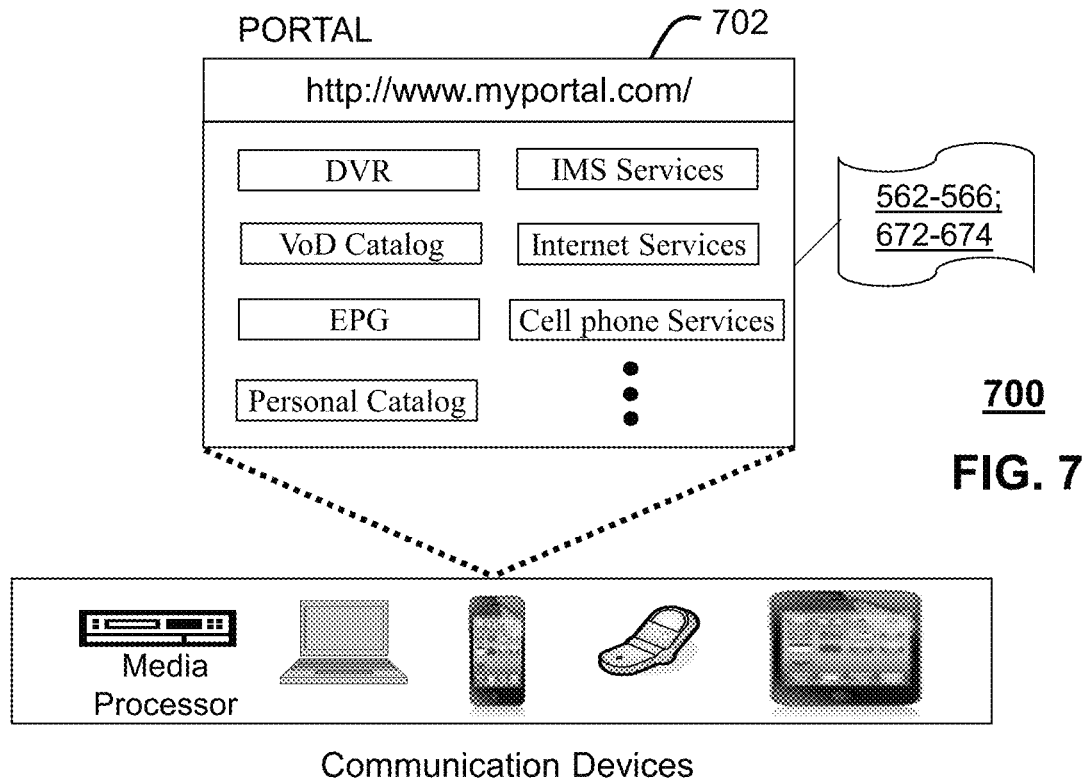
FIG. 7 depicts an illustrative embodiment of a web portal for interacting with the communication systems of a multimedia messaging management system.

FIG. 7 depicts an illustrative embodiment of a web portal 702 of a communication system 700. Communication system 700 can be overlaid or operably coupled with system 100 of FIG. 1, communication system 500, and/or communication system 500 as another representative embodiment of system 100 of FIG. 1, communication system 500, and/or communication system 600. The web portal 702 can be used for managing services of system 100 of FIG. 1 and communication systems 500-600. A web page of the web portal 702 can be accessed by a Uniform Resource Locator (URL) with an Internet browser or a wireless application using an Internet-capable communication device such as those described in FIG. 1 and FIGS. 5-6. The web portal 702 can be configured, for example, to access a media processor 506 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 506. The web portal 702 can also be used for provisioning IMS services described earlier, provisioning Internet services, provisioning cellular phone services, and so on.

The web portal 702 can further be utilized to manage and provision software applications 562-566, and 672-674 to adapt these applications as may be desired by subscribers and/or service providers of system 100 of FIG. 1, and communication systems 500-600. For instance, users of the services provided by server 110 or server 530 can log into their on-line accounts and provision the servers 110 or server 530 with security features and security preferences in sending media content in a multimedia messages as described in FIGS. 1-6. Service providers can log onto an administrator account to provision, monitor and/or maintain the system 100 of FIG. 1 or server 530. In other embodiments, a user can provide images or identification information (e.g. mobile telephone number) of intended or allowed recipients of the media content. Further, the user can provision the media content to be distorted upon delivery to a recipient. That is, the recipient does not perceive the distortion when viewed via a recipient communication device but a captured image (e.g. via screenshot or another image capturing device) of the distorted video results in a distorted image. In addition, the user can provision different types of distortion such as distorting faces in response to the media content containing images of particular people.

Figure 8:
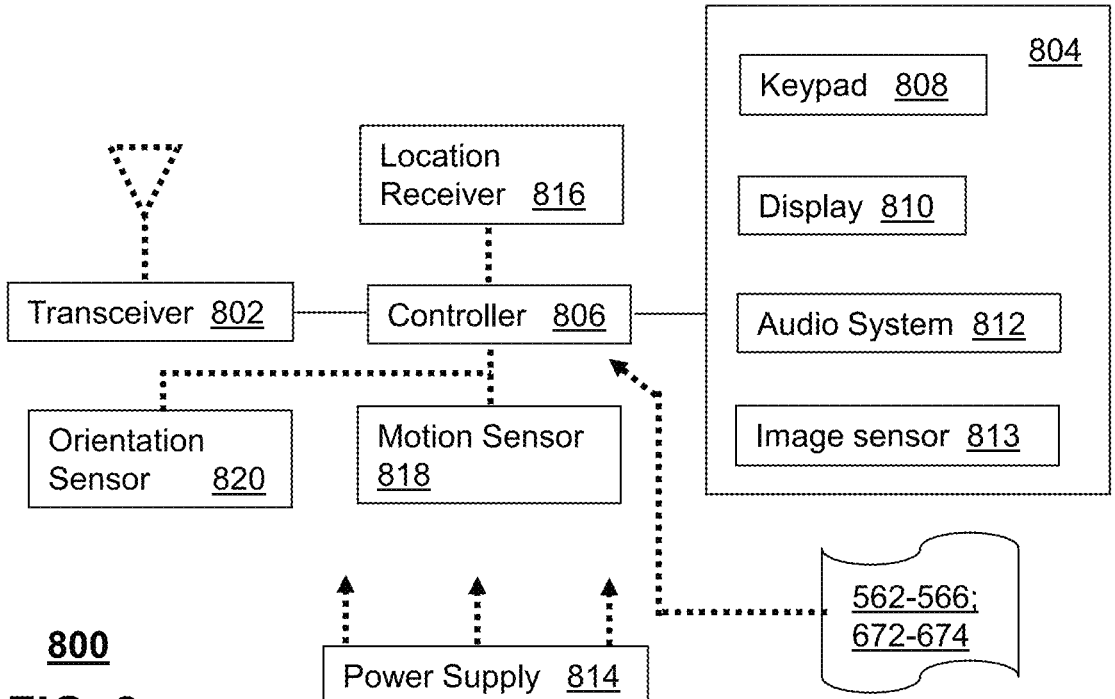
FIG. 8 depicts an illustrative embodiment of a network communication device.

FIG. 8 depicts an illustrative embodiment of a communication device 800. Communication device 800 can serve in whole or in part as an illustrative embodiment of the devices depicted in FIG. 1, and FIGS. 5-6 and can be configured to perform portions of methods 200, 300, and 400 of FIGS. 2-4. As an example, communication device 800 can be a recipient communication device that receives distorted video content representing an image. The distortion technique can include blackening pixels (e.g., randomly) in frames of the distorted video. A recipient user cannot perceive the blackened pixels in particular frames when viewing the distorted video, if generated from any type of media content (e.g. still image, video, etc.). However, if the recipient user 170 captures a screen shot of the distorted video or captures an image of the distorted video using another camera-enabled device (e.g. another smartphone), then the captured image of the distorted video contains blackened pixels such that the media content is unrecognizable (or otherwise distorted).

Communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth®. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. The communication device 800 can also include a slot for adding or removing an identity module such as a SIM card. SIM cards can be used for identifying subscriber services, executing programs, storing subscriber data, and so forth.

The communication device 800 as described herein can operate with more or less of the circuit components shown in FIG. 8. These variant embodiments can be used in one or more embodiments of the subject disclosure.

The communication device 800 can be adapted to perform the functions of the communication devices of FIG. 1, the media processor 506, the media devices 508, or the portable communication devices 516 of FIG. 5, as well as the IMS CDs 601-602 and PSTN CDs 603-605 of FIG. 6. It will be appreciated that the communication device 800 can also represent other devices that can operate in system 100 of FIG. 1, communication systems 500-600 of FIGS. 5-6 such as a gaming console and a media player. In addition, the controller 806 can be adapted in various embodiments to perform the functions 562-566 and 672-674, respectively.

Upon reviewing the aforementioned embodiments, it would be evident to an artisan with ordinary skill in the art that said embodiments can be modified, reduced, or enhanced without departing from the scope of the claims described below. For example, portions of, or whole embodiments can be combined with portions of, or whole other embodiments. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
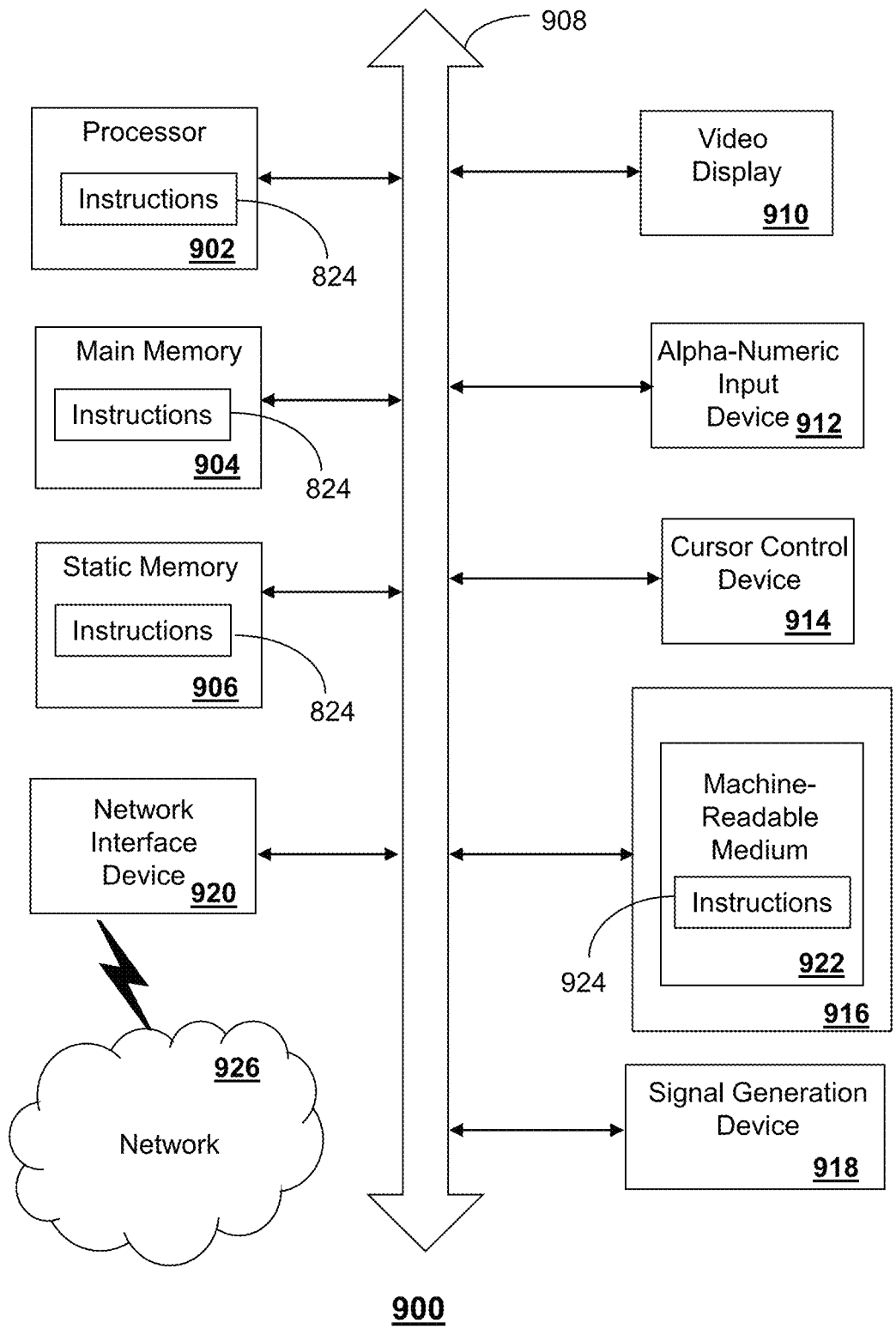
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the multimedia messaging servers 110 and 530 incorporating multimedia messaging security functions 120 and 562 as well as communication device 140 and 160 in system 100. In some embodiments, the machine may be connected (e.g., using a network 926) to other machines. In a networked deployment, the machine may operate in the capacity of a server or a client user machine in a server-client user network environment, or as a peer machine in a peer-to-peer (or distributed) network environment.

The machine which can be communication devices 140, 160, 516, 598, 605, and 698 as well as servers 110 and 530, may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information.

Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
    a processing system including a processor; and
    a memory that stores executable instructions that, when executed by the processing system, facilitate performance of operations, comprising:
        obtaining a first image from a first device;
        transmitting a first message to a second device, wherein the first message instructs the second device to capture a second image of a viewer of the second device resulting in a captured second image of the viewer and instructs the second device to provide the captured second image to the processing system;
        determining a security risk according to an analysis of the captured second image, wherein the security risk is based on a failure to identify the viewer in the captured second image as an authorized viewer or detecting another image capturing device in the captured second image; and
        generating distorted video content from the first image, wherein the distorted video content, when presented on the second device, is viewable as the first image, and wherein a distorted image results when a third image of the distorted video content is captured by one of the second device or another image capturing device;
providing the distorted video content to the second device;
transmitting a second message to the first device indicating the security risk;
retrieving the distorted video content from the second device responsive to receiving a recall message from the first device; and
transmitting a third message to the first device associated with the first image, wherein the third message indicates that the first image was not delivered to the second device responsive to a determination of the security risk.

2. The device of claim 1, wherein the operations further comprise identifying the second device on a list of allowed devices for the first image.

3. The device of claim 1, wherein the determining of the security risk further comprises determining that the first image contains censored content that is ineligible to be transmitted to the second device based on user preferences associated with the first device, the second device, or a combination thereof.

4. The device of claim 1, wherein the determining of the security risk further comprises identifying a person other than the authorized viewer or the other image capturing device according to the captured second image of the viewer.

5. The device of claim 1, wherein the generating of the distorted video content comprises randomly altering a plurality of pixels in each frame of the distorted video content.

6. The device of claim 1, wherein the generating of the distorted video content comprises blurring a portion of each frame of the distorted video content.

7. The device of claim 1, wherein the operations further comprise determining a location of the second device, wherein determining of the security risk comprises determining the location of the second device is a high risk viewing area.

8. A non-transitory machine-readable storage medium, comprising executable instructions that, when executed by a processing system including a processor, facilitate performance of operations, comprising:
receiving a first image, delivery instructions, and metadata associated with the first image from a first device associated with a first user, wherein the delivery instructions indicate to deliver the first image to a second device associated with a second user, and wherein the delivery instructions comprise a plurality of security features and the metadata comprises a plurality of security preferences for delivery;
transmitting a first message to the second device, wherein the message instructs the second device to capture a second image of a viewer of the second device resulting in a captured second image of the viewer and provide the captured second image to the processing system;
generating distorted video content from the first image, wherein the distorted video content, when presented on the second device, is viewable as the first image responsive to identifying a security risk in delivering the first image to the second device, and wherein a distorted image results when a third image of the distorted video content is captured by one of the second device or another image capturing device;
providing the distorted video content to the second device;
transmitting a second message to the first device indicating the security risk;
retrieving the distorted video content from the second device responsive to receiving a recall message from the first device; and
providing a third message to the first device that the first image was not delivered to the second device.

9. The non-transitory machine-readable storage medium of claim 8, wherein the operations further comprise identifying the second user on a list of allowed recipients for the first image.

10. The non-transitory machine-readable storage medium of claim 8, wherein the identifying of the security risk further comprises determining that the first image contains censored content that is ineligible to be transmitted to the second device based on user preferences associated with the first device, the second device, or a combination thereof.

11. The non-transitory machine-readable storage medium of claim 8, wherein the identifying of the security risk further comprises identifying the viewer as a person other than an authorized user or the other image capturing device according to the captured second image of the viewer.

12. The non-transitory machine-readable storage medium of claim 8, wherein the generating of the distorted video content comprises randomly altering a plurality of pixels in each frame of the distorted video content.

13. The non-transitory machine-readable storage medium of claim 8, wherein the generating of the distorted video content comprises blurring a portion of each frame of the distorted video content.

14. The non-transitory machine-readable storage medium of claim 8, wherein the operations further comprise determining a location of the second device, wherein identifying of the security risk comprises determining the location of the second device is a high risk viewing area.

15. A method, comprising:
receiving, by a processing system, including a processor, a first image, delivery instructions, and metadata associated with the first image from a first device associated with a first user, wherein the delivery instructions indicate to deliver the first image to a second device associated with a second user, and wherein the delivery instructions comprise a plurality of security features and the metadata comprises a plurality of security preferences for delivery;
transmitting, by the processing system, a first message to the second device, wherein the first message instructs the second device to capture a second image of a viewer of the second device resulting in a captured second image of the viewer and provide the captured second image to the processing system; and
generating distorted video content from the first image, wherein the distorted video content, when presented on the second device, is viewable as the first image responsive to identifying a security risk in delivering the first image to the second device, and wherein a distorted image results when a third image of the distorted video content is captured by one of the second device or another image capturing device;
providing the distorted video content to the second device;
transmitting a second message to the first device indicating the security risk;
retrieving the distorted video content from the second device responsive to receiving a recall message from the first device; and providing, by the processing system, a third message to the first device that the first image was not delivered to the second device.

16. The method of claim 15, comprising identifying, by the processing system, the second user on a list of allowed recipients for the first image.

17. The method of claim 15, comprising determining, by the processing system, that the first image contains censored content that is ineligible to be transmitted to the second device based on user preferences associated with the first device, the second device, or a combination thereof.

18. The method of claim 15, comprising identifying, by the processing system, the viewer as a person other than an authorized user or the other image capturing device according to the captured second image of the viewer.

19. The method of claim 15, wherein the generating of the distorted video content comprises randomly altering a plurality of pixels in each frame of the distorted video content.

20. The method of claim 15, wherein the generating of the distorted video content comprises blurring a portion of each frame of the distorted video content.

\* \* \* \* \*